UNITED STATES PATENT OFFICE.

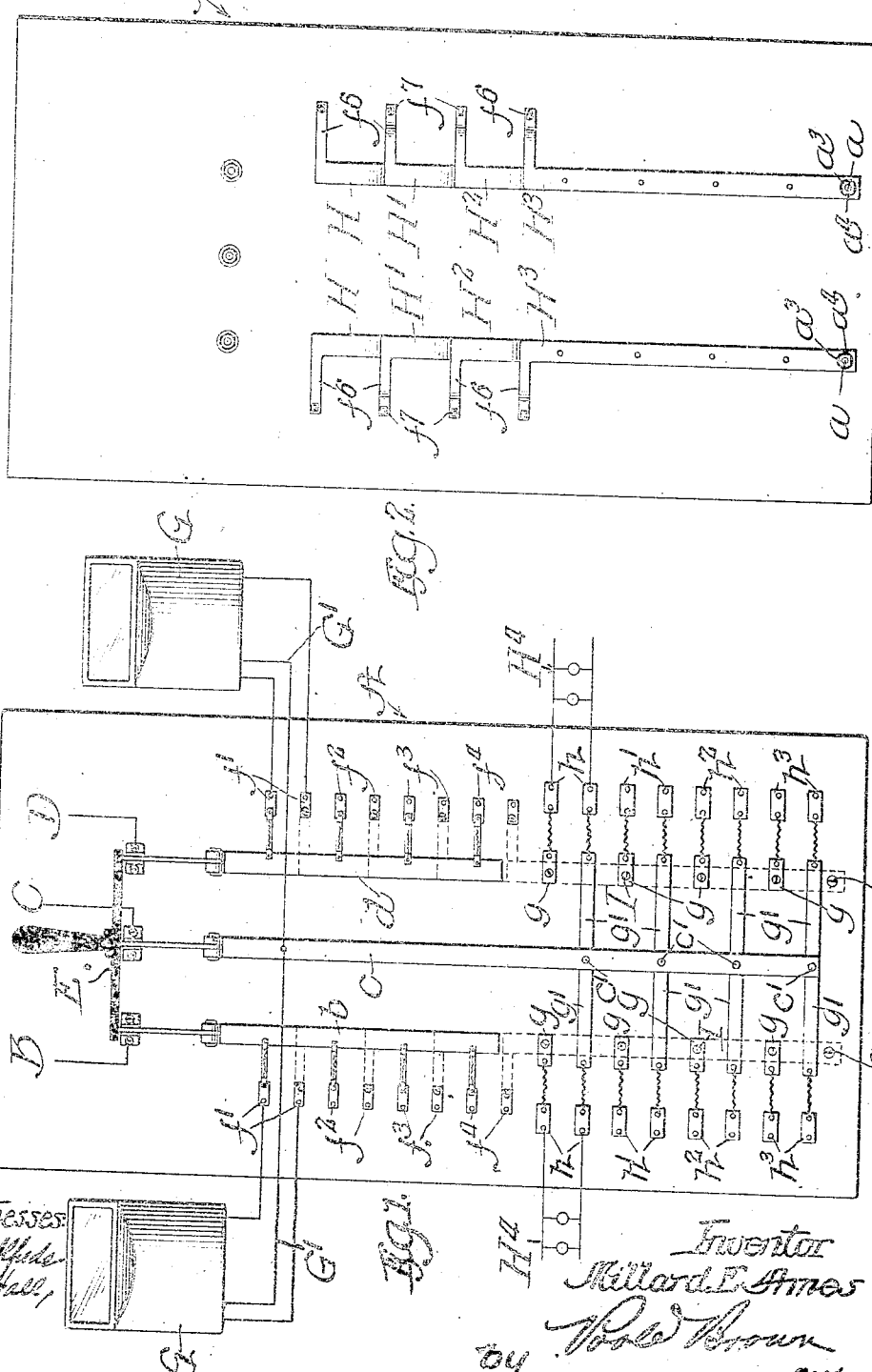

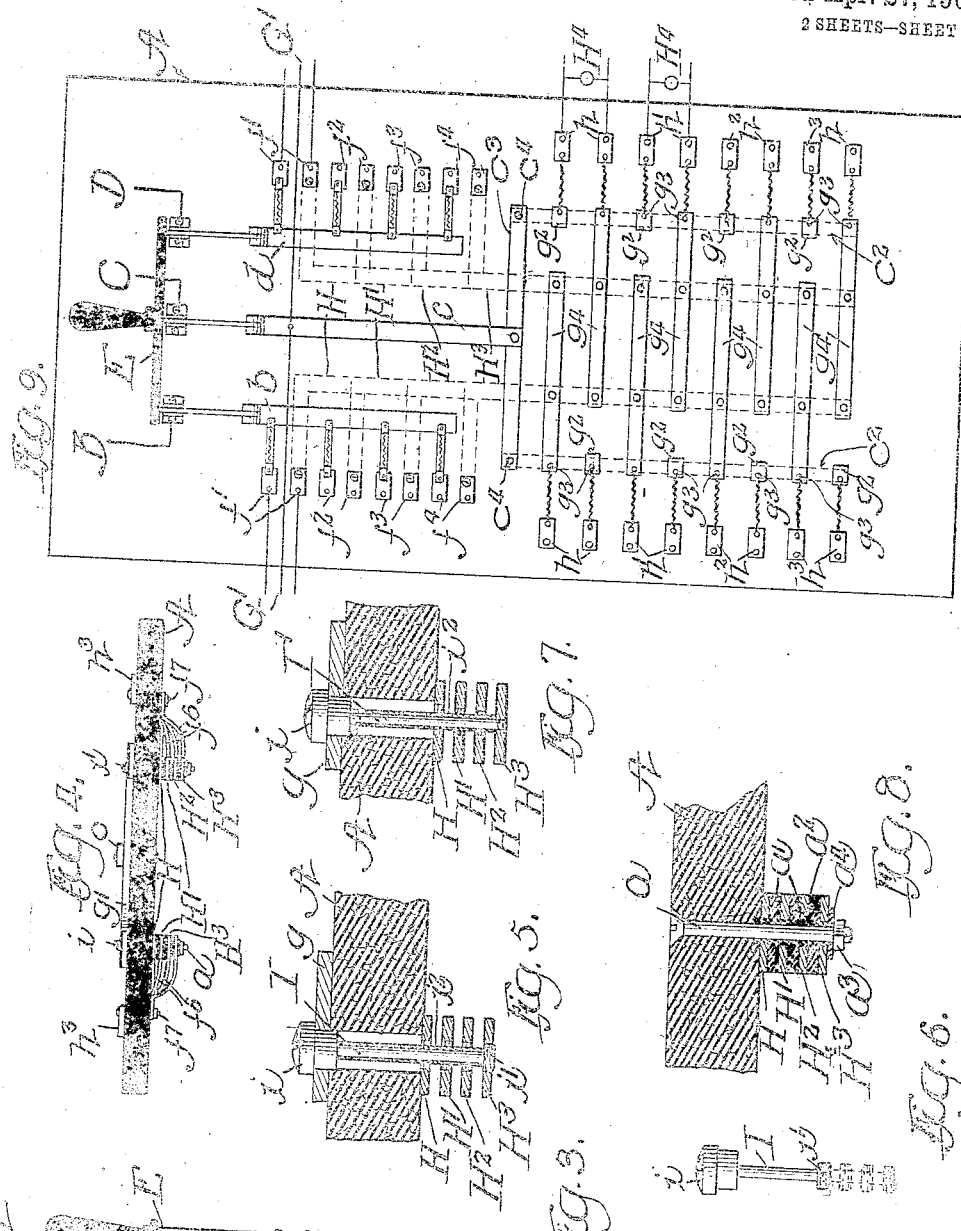

MILLARD E. AMES, OF CHICAGO, ILLINOIS, ASSIGNOR OF ONE-HALF TO FREDERICK R. JENKINS, OF CHICAGO, ILLINOIS.

PANEL-BOARD FOR ELECTRIC-POWER DISTRIBUTION.

No. 919,516.    Specification of Letters Patent.    Patented April 27, 1909.

Application filed October 21, 1908. Serial No. 458,758.

*To all whom it may concern:*

Be it known that I, MILLARD E. AMES, a citizen of the United States, and a resident of Chicago, in the county of Cook and State of Illinois, have invented certain new and useful Improvements in Panel-Boards for Electric-Power Distribution; and I do hereby declare that the following is a full, clear, and exact description thereof, reference being had to the accompanying drawings, and to the letters of reference marked thereon, which form a part of this specification.

This invention relates to a system of electrical current distribution, wherein a number of users' or consumption circuits are supplied from a single source and the consumption of the current supplied to said circuits is accounted for by metering the same.

The invention refers to improvements in a system of this character whereby arrangements are made for the establishment of connections between any of the meter circuits and any of said consumption circuits, and seeks to provide an improved construction and arrangement of the parts of a panel board at a central distributing point at which the rearrangement of the circuits is made.

As shown in the drawings:—Figure 1 is a front face view of a panel board embodying my invention, showing its connection with the meter and consumption circuits. Fig. 2 is a rear face view of the panel board. Fig. 3 is a longitudinal elevation of the panel board. Fig. 4 is an end view thereof. Fig. 5 illustrates a method of establishing electrical connection between the conductors of the meter and the consumption circuits. Fig. 6 illustrates a plug constituting part of said connection, illustrating the different lengths of plugs for different connections. Fig. 7 is a modified form of connection between the conductors of the meter and consumption circuits. Fig. 8 illustrates means for fixing the bus bars to the panel board. Fig. 9 is a front face view of a panel board showing a modified arrangement of the meter and translating circuit conductors.

My invention is herein illustrated as designed for a three wire system, but it will be understood that it is equally applicable to a two wire system.

As shown in the drawings, A designates a slab of marble, slate or other insulating material upon which the permanently fixed parts of the panel board construction are mounted, and which constitutes also an insulating medium between the sides of different polarities of the circuits. The supply mains B, C, D are connected, respectively, to the positive, neutral and negative bus-bars $b$, $c$, $d$ through the switch E, which lies on the front face of the slab A and is attached thereto in any suitable manner.

In Fig. 1 of the drawings are shown eight pairs of meter circuit terminals, in two sets with one set of four pairs arranged on each side of the neutral bus bar, and designated on each side as $f^1$, $f^2$, $f^3$, $f^4$. Each pair of said terminals is adapted for connection with a meter G. One terminal of each pair of said terminals $f^1$, $f^2$, $f^3$, $f^4$ is fuse connected to the main (through the bars $b$, $d$ as herein shown), while the remaining terminals of said pairs are connected, respectively, each to one of the stationary conductors or bus bars H, $H^1$, $H^2$, $H^3$ lying at the rear of the panel board and arranged in different superposed, but separated parallel planes, that is, one behind the other. The connection between said latter terminals and the conductors or bus bars H, $H^1$, $H^2$, $H^3$ consists of bars $f^6$, $f^6$ at the back of the board, connected in any suitable manner with the bus bars, and pins $f^7$, $f^7$ which pierce the board and extend through the bars $f^6$ and said last mentioned terminals. As shown in Fig. 1, there are two sets of said bus bars, one at each side of the neutral bus bar to correspond with the two sets of meter terminals. The bus bars H, $H^1$, $H^2$, $H^3$ constitute meter bars in the arrangement herein shown. In the present instance, said bus bars are attached to the board A by said connecting bars $f^6$ and the pins $f^7$ at one end thereof and attaching bolts $a$ extending through the board and through alined apertures in the bars at the other end thereof. Said latter bolts pass also through spacing blocks $a^1$, made of insulating material, by which the bars may be held at the proper insulating distance apart. The attaching bolts are surrounded by insulating bushings $a^2$ by which they are insulated from the bars, and the nut $a^3$ of the bolt bears against insulating washers $a^4$ which lie against the rear face of the rearmost bar. A third wire $G^1$ connects each meter with the neutral bar $c$ to furnish a shunt current for operating the meter.

Arranged on the side of the board remote from the bus bars H, H¹, H², H³ are consumption circuit conductors $g$, $g^1$. Said conductors are arranged in pairs, the conductor $g$ of each pair being connected with one side of the consumption circuit and the conductor $g^1$ with the other side of said circuit. Each pair of consumption circuit conductors is adapted to be fuse-connected to an adjacent pair of terminals $h$, $h^1$, $h^2$, $h^3$ belonging to a consumption or load circuit H⁴. In the construction shown in Fig. 1, the consumption circuit conductors $g$, $g^1$ are arranged in two laterally separated sets to correspond with the arrangement of the bus bar $c$.

The conductor $g^1$ at one side of each consumption circuit, is connected permanently to the neutral bus bar $c$ by means of pins $c^1$ which may penetrate the board and constitute means for fastening the neutral bus bar in place if desired. The opposite side of each pair of consumption circuit conductors $g$, $g^1$ is adapted to be separately connected with either of said bus bars H, H¹, H², H³ by means of one of a plurality of plugs I, as shown in Fig. 5. With the consumption circuit conductors $g$, $g^1$ arranged in sets on opposite sides of the neutral bus bar $c$, the conductors $g^1$ may take the form of elongated bars which extend from one set to the other across the neutral bus bar, while the conductors $g$ may take the form of short plates arranged in line with and spaced longitudinally of the sets of bus bars H, H¹, H², H³.

The pins I extend through alined openings in the conductors $g$, the board A and the bus bars H, H¹, H², H³. Each plug comprises a shank having at one end a slotted head $i$ adapted for electrical contact with the conductor $g$, and provided at its other end with an enlarged screw-threaded portion $i^1$. The shank of the plug is surrounded by an insulating bushing $i^2$. The apertures in said bus bars are screw-threaded to receive the screw-threaded portions $i^1$ of the plugs and the plugs are made of different lengths, as indicated in full and dotted lines in Fig. 6, so that by the use of a plug I of proper length a consumption circuit conductor $g$ may be separately connected with either one of said meter bus bars. That is to say, if it be desired to connect a consumption circuit conductor $g$ with the bus bar H a plug will be employed having an enlarged screw-threaded portion $i^1$ which reaches only the bus bar H, and no farther; and the enlarged portion of said plug will have screw-threaded engagement with only the bar H. On the other hand, if one of the bus bars in rear of the bus bar H is to be connected with said conductor $g$, the stud is made of correspondingly greater length so that its enlarged portion $i^1$ will reach to and have screw-threaded engagement with the bus bar desired. In this construction it will be observed that a plug of a length to reach beyond the bus bar H must be threaded through the screw-threaded apertures of the bar or bars between the board A and the bus bar with which it is designed to have final screw-threaded engagement.

In Fig. 7 I have shown a construction wherein the alined openings in the bus bars H, H¹, H², H³ are made of gradually decreasing diameters from the innermost to the outermost bar, the screw-threaded aperture of the innermost bar being made largest. The plugs I¹ used in the latter construction are made of different lengths, as in the former construction, and are screw-threaded at their ends to engage screw-threaded apertures of the appropriate bus bars. The plugs I¹, or at least the screw-threaded ends thereof, are made of varying diameters to fit the different diameters of the screw-threaded apertures of the bus bars, the plug of the shortest length being made of the greatest diameter and the longest plug being made of least diameter. With this construction each plug may be inserted without obstruction directly to the screw-threaded aperture of the bus bar to which it is designed for electrical contact.

In both constructions it will be observed that the engagement of the connecting plug with the bus bar is a screw-threaded engagement which is preferred by reason of its permanency and the reliability of the electrical connection. Other forms of electrical connection between the plugs and the bus bars may, however, be employed.

By reason of the foregoing construction it will be noted that in the three wire arrangement herein shown, one terminal of each pair of meter terminals is connected to either the positive or negative supply main and the other terminal is connected to its respective bus bar H, H¹, H², H³, while one conductor of each pair of consumption circuit conductors $g$, $g^1$ is connected to the neutral supply main and the other conductor of said pair is adapted for connection, through the plug I or I¹ or the equivalent, to any one of the bus bars H, H¹, H², H³. With this arrangement it will be apparent that either of the meters at one side of the board may be connected in circuit with either of the consumption circuits at that side of the board, and that all of the consumption circuits at one side of the board may be connected to either one of the associated meters, and that such connections may be made by simply inserting or removing one or more of said plugs and without change in the wiring.

The arrangement of the bus bars H, H¹, H² H³ which, in the instance shown, are meter bus bars, disposed one behind the other, or in different superposed, but separated parallel planes, and provided with alined apertures arranged in line with the apertures of the board A and conductors $g$ to receive connecting plugs of different lengths, is of great advantage, inasmuch as it contributes greatly to the compactness and simplicity of the construction. Such arrangement enables the capacity of the board to be increased by adding one or more bus bars $H$, $H^1$, etc. without the necessity of increasing the width of the board, the only increased dimension being the depth of the device as a whole.

In the construction shown in Figs. 1 and 2, the sets of meter and consumption circuits at each side of the bus bar are independent relatively to each other so that said board may be said to support two sets of meter and translating circuits having a single or common return.

In Fig. 9 I have shown a construction wherein the meter circuits at each side of the board may be connected with the consumption circuits on both sides of the board. In this construction the arrangement of the meter circuits and the connection thereof with the positive and negative feed wires are and may be the same as in the construction before described. The neutral bus bar $c$, however, is branched at a point about midway of the length of the board and the branches $c^2$ are located on the rear side of the board. Said branches are connected to the main bus bar by a transverse cross conductor $c^3$ on the front face of the board and pins $c^4$ which pierce the board $A$ and have electrical contact with the said cross member $c^3$ and the branches $c^2$. In the latter construction conductors $g^2$, corresponding to the conductors $g^1$ of the construction first described, have the form of plates and are located opposite the branches $c^2$ of the neutral bus bar. They are permanently connected with said branches by pins $g^3$ by which the fuse connection is made between said conductors $g^2$ and one side of the terminals $h$, $h^1$, $h^2$, $h^3$. The conductors $g^4$, corresponding to the conductors $g$ of the construction previously described, are elongated and extend inwardly across the front face of the board in crosswise relation to the two sets of bus bars $H$, $H^1$, $H^2$, $H^3$ on the rear side of the board. The said elongated conductors $g^4$, at their intersections with said bus bars, are apertured, in the same manner as the conductors $g$, to receive the plugs which connect the conductors $g^4$ with the bus bars $H$, $H^1$, $H^2$, $H^3$. Each of said conductors $g^4$, therefore, is provided with two apertures to receive said connecting plugs, whereby one side of each consumption circuit may be connected with any of the meter circuits located on either side of the board. It will be understood that a conductor $g^4$ will be so connected at any given time through but one of its plug receiving apertures at its intersections with either of the two sets of bus bars.

It will be noted that the conductors through which the various connections are made between the meter circuits and the consumption circuits are permanent parts of the device itself and are immovably located on the panel board.

While I have shown the bus bars and conductors located on and fixed to the opposite sides of the panel board and insulated thereby from each other, I do not limit the invention thereto except as hereinafter specifically claimed inasmuch as the conductors of opposite polarity may be otherwise insulated or otherwise supported on a "panel board", while retaining the arrangement of said conductors substantially as hereinbefore described, whereby the conductors of opposite polarity (here shown on opposite sides of the board) may be connected in the manner described.

Other structural changes may be made within the scope of the invention and I do not wish to be limited to the exact construction shown except as to claims hereinafter in which specific details are claimed.

I claim as my invention:—

1. In a system of electrical current distribution including supply mains and conductors, meter circuits, each having one side connected to a supply main and its other side to a conductor, translating circuits each having one side connected to another of the supply mains and its other side to a conductor, the conductors being arranged in sets, and one of the sets of conductors comprising superposed, parallel, separated bars, and means for connecting any one of the conductors of one set with any one of the conductors of the other set.

2. In a system of electrical current distribution including supply mains and conductors, meter circuits, each having one side connected to a supply main and its other side to a conductor, translating circuits each having one side connected to another of the supply mains and its other side to a conductor, the conductors being arranged in sets, and one of the sets of conductors comprising superposed, parallel, separated bars and the other set of conductors being arranged along the length of the superposed set, and means for connecting any one of the conductors of one set with any one of the conductors of the other set.

3. In a system of electrical current distribution including supply mains and conductors, meter circuits, each having one side connected to a supply main and its other side to a conductor, translating circuits each having one side connected to another of the supply mains and its other side to a conductor, the conductors being arranged in sets, and one of the sets of conductors comprising superposed, parallel, separated bars and the other set of conductors being arranged along the length of the superposed set, the said bars of the one set being provided at longitudinal intervals with alined openings, and the conductors of the other set being provided in alinement therewith with other openings, and plugs arranged to extend through said alined openings to connect any one of the conductors of one set with any one of the conductors of the other set.

4. In a system of electrical current distribution including supply mains, meter circuits, one terminal of each being connected to a supply main, translating circuits, one terminal of each being connected to another supply main of different potential from the first, and conductors one for each of the remaining terminals of the meter circuits and translating circuits, the conductors for each circuit being arranged in a set, one of the sets of conductors embracing bars arranged in different superposed, but separated parallel planes, provided with longitudinally spaced alined openings, and the other set being provided in alinement with said openings with other openings, and plugs of different lengths arranged to be plugged from one set to the other to connect any one of the conductors of one set to any one of the conductors of the other set.

5. In a system of electric current distribution including supply mains, bus bars and translating circuit conductors, meter circuits, each having one side connected to a supply main and its other side to a bus bar, translating circuits each having one side connected to another of the supply mains and its other side to a conductor, said bus bars being arranged in different superposed, but separated planes, and the translating circuit conductors being arranged along the length of the bus bars, the said conductors and bus bars being provided with alined openings arranged to receive plugs of different lengths by which any one of the conductors may be connected with any one of said bus bars, and plugs screw-threaded for engagement with screw-threads in the openings of said bus bars.

6. In a panel board for electrical current distribution, the combination with a body, of two sets of conductors, on said body and insulated from each other, one set comprising bars arranged in different superposed, but separated parallel planes, and the other set being arranged along the length of said bars, and means for plugging through from any conductor of the one set to any one of the bars of the other set.

7. In a panel board for electrical current distribution, the combination with an insulating body, of two sets of conductors, arranged one on each side of said body, one set comprising bars arranged in different superposed, but separated parallel planes, and the other set being arranged along the length of said bars, the said body and the last mentioned conductors being apertured to receive conducting plugs and the superposed bars being apertured in alinement therewith to receive plugs of different lengths to permit any one of the bars to be connected with any one of the conductors of the other set.

8. In a panel board for electrical current distribution, the combination with an insulating body, of two sets of conductors arranged one on each side of said body, one set comprising bars arranged in different superposed, but separated parallel planes, and the other set being arranged along the length of said bars, and screw-threaded plugs of different lengths arranged to be plugged through said conductors and bars for screw-threaded engagement with the latter to connect any one conductor of the one set with any one of the bars of the other set.

9. In a panel board for electrical current distribution, the combination with an insulating body, of two sets of conductors, arranged one on each side of said body, one set comprising bars arranged in different superposed, but separated parallel planes, and the other set being arranged along the length of said bars, the said body and the last mentioned conductors being apertured and the superposed bars being apertured in alinement with the apertures of the body, and plugs of different lengths arranged to be inserted through said alined apertures, said plugs being each screw-threaded to engage screw-threads in the opening of its appropriate bar.

10. In a panel board for electrical current distribution, the combination with an insulating body, of two sets of conductors arranged one on each side of said body, one set comprising bars arranged in different superposed, but separated parallel planes, and the other set being arranged along the length of the said bars, means for plugging through from any one of the conductors of the one set to any one of the bars of the other set, supply main terminals mounted on said insulating body, means for electrically connecting one of said terminals with one set of conductors, and other means for electrically connecting another terminal to the other set of conductors.

11. In a panel board for electric current distribution, the combination with a supporting body, of two sets of conductors supported thereon, one set being insulated from the other set, one set of said conductors comprising bars arranged in different superposed but separated parallel planes, and said bars being provided along their length with alined apertures, the other set of said conductors being arranged along the length of the bar conductors and apertured in alinement with the apertures of said bar conductors, and plugs of different lengths arranged to be inserted through the apertures of the two sets of conductors to connect any one of the conductors of one set to any one of the conductors of the other set.

12. In a panel board for electric current distribution, the combination with a supporting body, of two sets of conductors supported thereon, one set being insulated from the other set, one set of said conductors comprising bars arranged in different superposed but separated parallel planes, and said bars being provided along their length with alined apertures, the other set of said conductors being arranged along the length of the bar conductors, and apertured in alinement with the apertures of said bar conductors, plugs of different lengths arranged to be inserted through the apertures of the two sets of conductors to connect any one of the conductors of one set to any one of the conductors of the other set, and insulating sleeves surrounding the shanks of said plugs and arranged to leave the ends of the plugs bared for contact with the appropriate conductors of the superposed set.

In testimony, that I claim the foregoing as my invention I affix my signature in the presence of two witnesses, this 17th day of October A. D. 1908.

MILLARD E. AMES.

Witnesses:
WILLIAM L. HALL,
GEORGE R. WILKINS.